US009751782B2

(12) United States Patent
McCurdy

(10) Patent No.: US 9,751,782 B2
(45) Date of Patent: Sep. 5, 2017

(54) WASTEWATER TREATMENT SYSTEM AND METHOD

(71) Applicant: DuBois Chemicals, Inc., Sharonville, OH (US)

(72) Inventor: Brent K. McCurdy, Bryn Athyn, PA (US)

(73) Assignee: DuBois Chemicals, Inc., Sharonville, OH (US)

( * ) Notice: Subject to any disclaimer, the term of this patent is extended or adjusted under 35 U.S.C. 154(b) by 226 days.

(21) Appl. No.: 13/830,753

(22) Filed: Mar. 14, 2013

(65) Prior Publication Data

US 2014/0263079 A1    Sep. 18, 2014

(51) Int. Cl.
| | | |
|---|---|---|
| B01D 21/01 | (2006.01) | |
| B01D 21/24 | (2006.01) | |
| C02F 1/52 | (2006.01) | |
| C02F 1/56 | (2006.01) | |
| C02F 1/72 | (2006.01) | |
| C02F 103/44 | (2006.01) | |

(52) U.S. Cl.
CPC .......... *C02F 1/5281* (2013.01); *C02F 1/5209* (2013.01); *C02F 1/5245* (2013.01); *C02F 1/5272* (2013.01); *C02F 1/56* (2013.01); *C02F 1/722* (2013.01); *C02F 2103/44* (2013.01); *C02F 2209/42* (2013.01); *C02F 2303/02* (2013.01)

(58) Field of Classification Search
CPC ........ C02F 1/52; C02F 1/5281; C02F 1/5209; C02F 9/00; C02F 2201/005; C02F 2209/11; C02F 2209/42; C02F 2209/003; C02F 11/14; B01D 21/0024; B01D 21/24; B01D 21/08; B01D 21/2433; B01D 21/2444; B01D 21/03; B01D 21/307; B01D 21/0012; B01D 21/02; B01D 21/01; B01D 21/2405; B01D 21/245; B01D 21/00; B01D 21/0027; B01D 21/32
USPC ....... 210/121, 123, 200, 201, 202, 206, 209, 210/744, 745, 702, 704, 749, 776, 806, 210/257.1, 259, 43, 85, 96.1, 94, 86, 104, 210/513, 538, 540
See application file for complete search history.

(56) References Cited

U.S. PATENT DOCUMENTS

| | | | | |
|---|---|---|---|---|
| 3,618,766 A | * | 11/1971 | Morey ................. | B01D 23/14 210/745 |
| 3,937,662 A | * | 2/1976 | Bartik ................. | 210/747.6 |
| 4,173,532 A | * | 11/1979 | Keoteklian ................. | 210/631 |
| 4,784,764 A | * | 11/1988 | Kleinschnittger et al. .. | 210/96.1 |

(Continued)

FOREIGN PATENT DOCUMENTS

CN    101786675 A    *    7/2010

OTHER PUBLICATIONS

Deng et al, CN 101786675 English machine translation, Jul. 28, 2010, pp. 1-8.*

*Primary Examiner* — Claire Norris
(74) *Attorney, Agent, or Firm* — Riverside Law LLP

(57) ABSTRACT

The present invention relates to systems and methods of wastewater treatment that rely primarily on the use of water treatment chemicals to clean wastewater without the need to use filtration mechanisms. The present invention generally provides a system that is less complex and less expensive to operate than wastewater treatment systems in the prior art.

20 Claims, 6 Drawing Sheets

(56) References Cited

U.S. PATENT DOCUMENTS

| | | | |
|---|---|---|---|
| 5,873,996 A * | 2/1999 | Rozelle | C02F 1/281 210/104 |
| 6,159,362 A * | 12/2000 | Gilmore | 210/121 |
| 2010/0044285 A1* | 2/2010 | Fukuda et al. | 210/86 |
| 2011/0303622 A1* | 12/2011 | Saik | 210/201 |

* cited by examiner

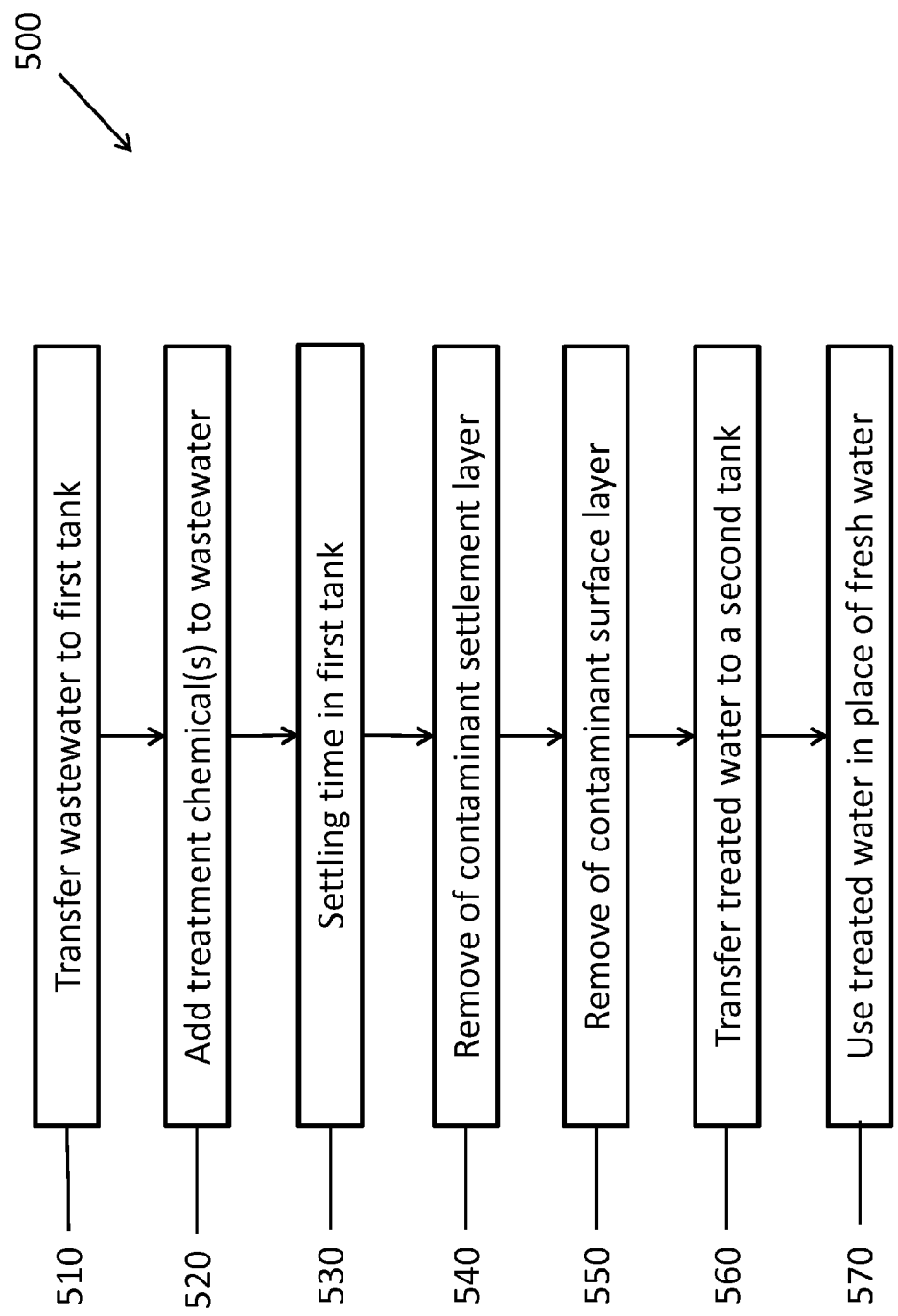

WASTEWATER TREATMENT SYSTEM AND METHOD

BACKGROUND OF THE INVENTION

The cleaning of cars, trucks, and other transportation equipment produces a significant amount of wastewater. Commercial or industrial facilities typically utilize systems for reclaiming at least a portion of the wastewater that is generated, so that it can be reused in cleaning processes. Recycling wastewater provides substantial cost savings to commercial and industrial facilities because it reduces the need to pay for fresh potable-grade water, which is typically much more expensive than water obtained through recycling. In some cases, wastewater needs to be treated so that it meets the regulatory specifications required for sending water to the sewer system or the environment.

The primary goal of wastewater treatment is to reduce or eliminate many different types of contaminants, such as oil and grease; dirt and other particulate matter; and microorganisms. Accordingly, there are a number of methods in the prior art for treating wastewater so that it can be recycled for use in cleaning activities or other applications. First and foremost, wastewater treatment systems and methods often involve the use of various filtration devices to remove particulates. In addition to filtration mechanisms, a number of other systems or methods may be used in wastewater treatment systems, such as chemical treatment, biological systems, aeration systems, and UV treatment systems for deodorizing treated water. Often, wastewater treatment systems in the prior art use a combination of most or all of the above systems or methods. However, there are no systems or methods for wastewater treatment in the prior art based solely on chemical treatment.

Furthermore, wastewater treatment systems often include expensive and complex equipment that may be difficult to operate and maintain. In many cases, the operators of carwashes have a limited understanding of how to operate and maintain commercial wastewater treatment systems. This lack of understanding may result in carwash operators completely avoiding the use of commercial systems because these systems do not provide treated water of acceptable standards when the systems are not maintained or operated properly.

Accordingly, there is a continuing need in the art for wastewater treatment systems and methods that effectively clean water while being relatively simple and inexpensive to operate and maintain. The present invention addresses this continuing need in the art.

SUMMARY OF INVENTION

The present invention relates to systems and methods of wastewater treatment. In one embodiment, the method of wastewater treatment comprises the steps of: adding wastewater to a first tank; adding at least one treatment chemical to said wastewater; holding for a settling time, such that at least a portion of contaminants present in said wastewater settle to a bottom region of said first tank during said settling time to form a contaminant layer; and removing said contaminant layer from said first tank. The method may further comprise the steps of transferring water remaining in said first tank to a second tank; filtering said wastewater to remove a contaminant; and/or removing a scum or foam layer. In one embodiment, the method may comprise the step of sensing the contaminant level in water exiting said first tank and directing the flow of water according to the sensed level of contaminant in the water.

The system of the present invention may comprise a first tank; a valve assembly fluidly connected to said first tank; a second tank; a plurality of conduits fluidly connecting said valve assembly to said second tank and a waste reservoir; at least one treatment chemical source; and a wastewater source; wherein when wastewater is added from said wastewater source to said first tank, at least one treatment chemical is added from said at least one treatment chemical source to said wastewater. In one embodiment, the first tank further comprises an exit port directing flow to a valve assembly. The first tank and/or second tank may further comprise additional components, such as a skimmer; at least one float sensor for measuring water level in a tank; a turbidimeter; a dosing pump for adding at least one treatment chemical; and a controller for adjusting an addition rate of said at least one treatment chemical.

The at least one treatment chemical of the systems and methods of the present invention may comprise a coagulant, for example an aluminum chlorohydrate; a flocculant, for example an anionic partially hydrolyzed polyacrylamide; and a deodorizer, for example DuBois/Mitco NILODOR J885 deodorizer or hydrogen peroxide.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 6 is a flowchart of an exemplary wastewater treatment method.

DETAILED DESCRIPTION

Figure 1:
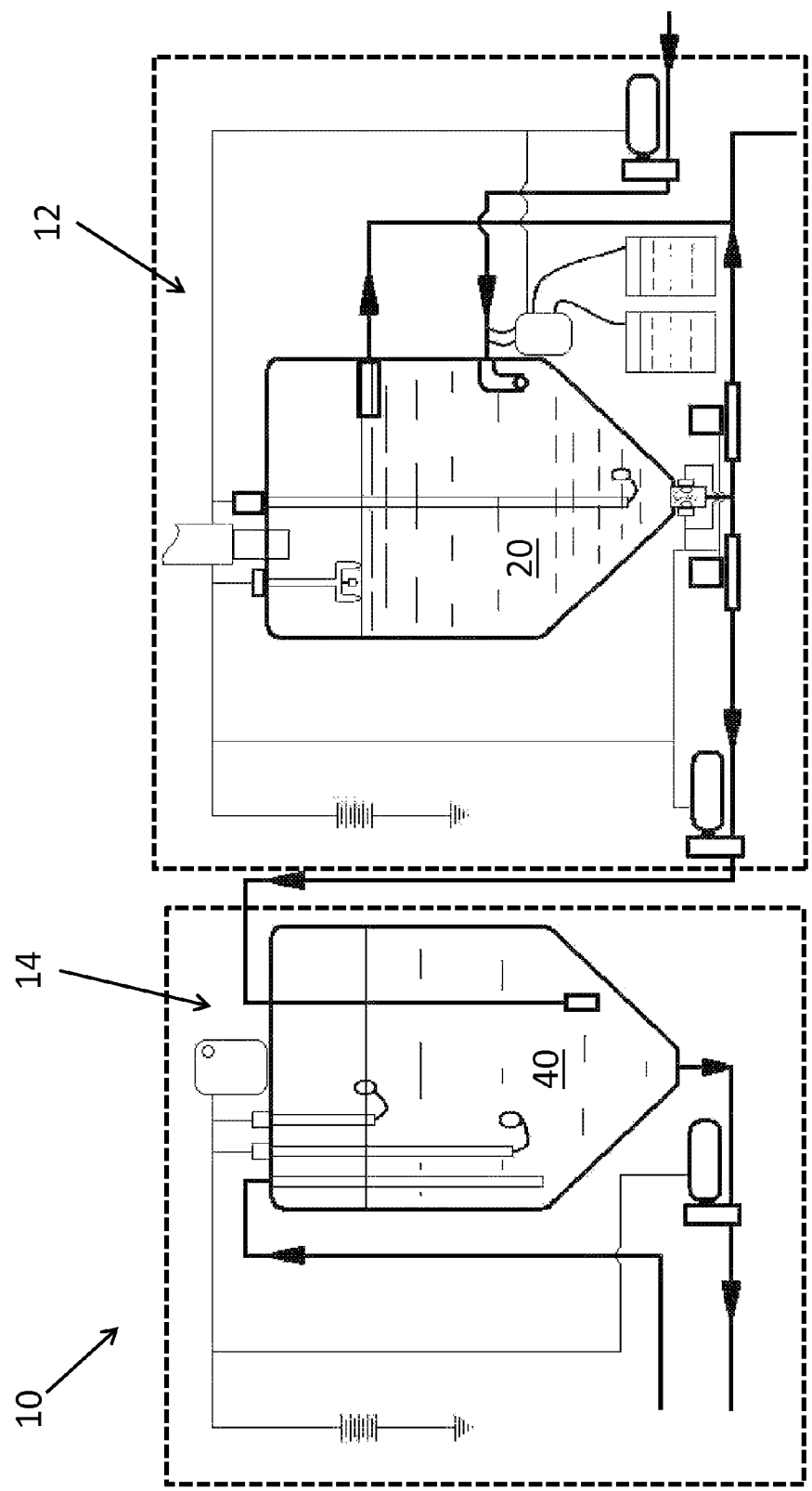
FIG. 1 is a schematic of an exemplary multi-tank water treatment system.

The present invention relates to wastewater treatment systems and methods that can clean water without reliance on conventional mechanical filtration mechanisms. The method of wastewater treatment is based on the addition of treatment chemicals, for example coagulants and flocculants, that bind dirt or other contaminants in the wastewater together, and cause the contaminants to settle out of the wastewater so they can be removed. The water treatment systems and methods can be used to generate water suitable for use in the transportation cleaning industry, in addition to any other field where clean water is needed, without limitation. The present invention is based on a less complex system and method than the wastewater treatment systems of the prior art, thereby providing a system that is easier to operate and less expensive to purchase. Further, the present invention provides automated systems for wastewater treatment that minimize or eliminate the need for manual operation or maintenance.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

The terms "contaminants," "dirt," "soil," "grease," and the like are used interchangeably herein, and refer to any substances present in wastewater that need to be substantially removed from the wastewater prior to reusing the wastewater. Such substances are often not miscible with or soluble in water, but can instead be integrated with the wastewater by way of suspension, emulsification, colloidal dispersion, or some other means.

The term "coagulant" or "coagulant chemical" as used herein refers to a chemical or agent that causes contaminant particles in wastewater to bind or clump together by neutralizing the electrical charges of the particles, or through some other means.

The term "flocculant" or "flocculant chemical" as used herein refers to a chemical or agent that causes coagulated contaminant particles to further coagulate or aggregate together to increase the propensity of the contaminant particles to settle out of wastewater.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

The present invention relates to systems and methods for treating or cleaning wastewater from a source of wastewater, such as from a car wash or other transportation cleaning process. The treated water can then be recycled back into the cleaning process, or used for other purposes in which cleaned water is desired.

As shown in FIG. 1, the system of the present invention can be generally described as follows. The present invention includes a water treatment system 10 that includes a treatment station 12 comprising a first tank or treatment tank 20, and a storage station 14 comprising a second tank or storage tank 40. Generally, wastewater is delivered to treatment tank 20, and the resulting clean water is transferred to storage tank 40. However, in various embodiments, the system of the present invention may comprise only a treatment station 12, thereby utilizing existing infrastructure, i.e. tanks or wastewater pits unrelated to the present invention, that were previously installed in the facility in which the present invention is used.

Figure 2:
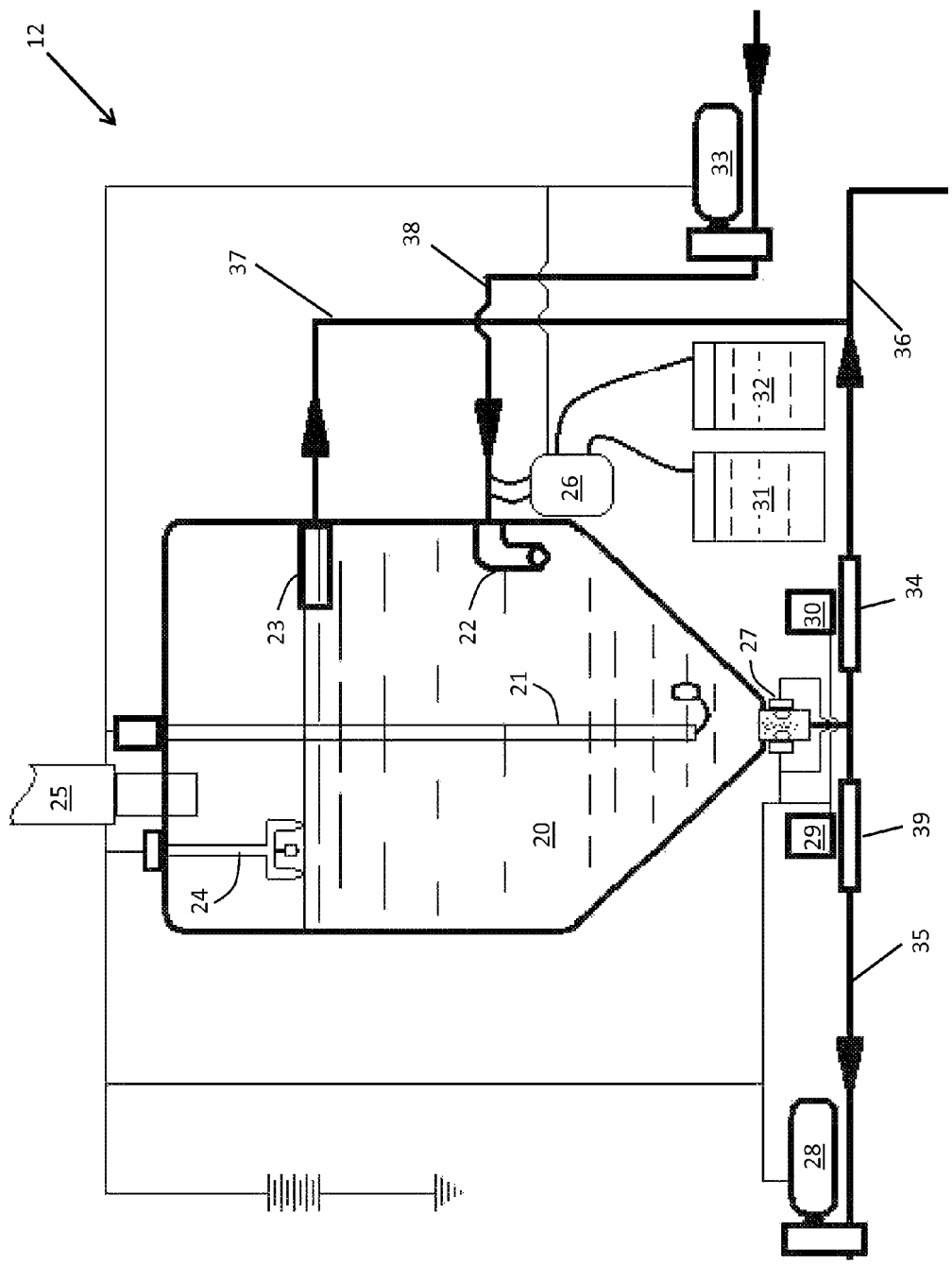
FIG. 2 is a schematic of the treatment station of the water treatment system of FIG. 1.
Figure 3:
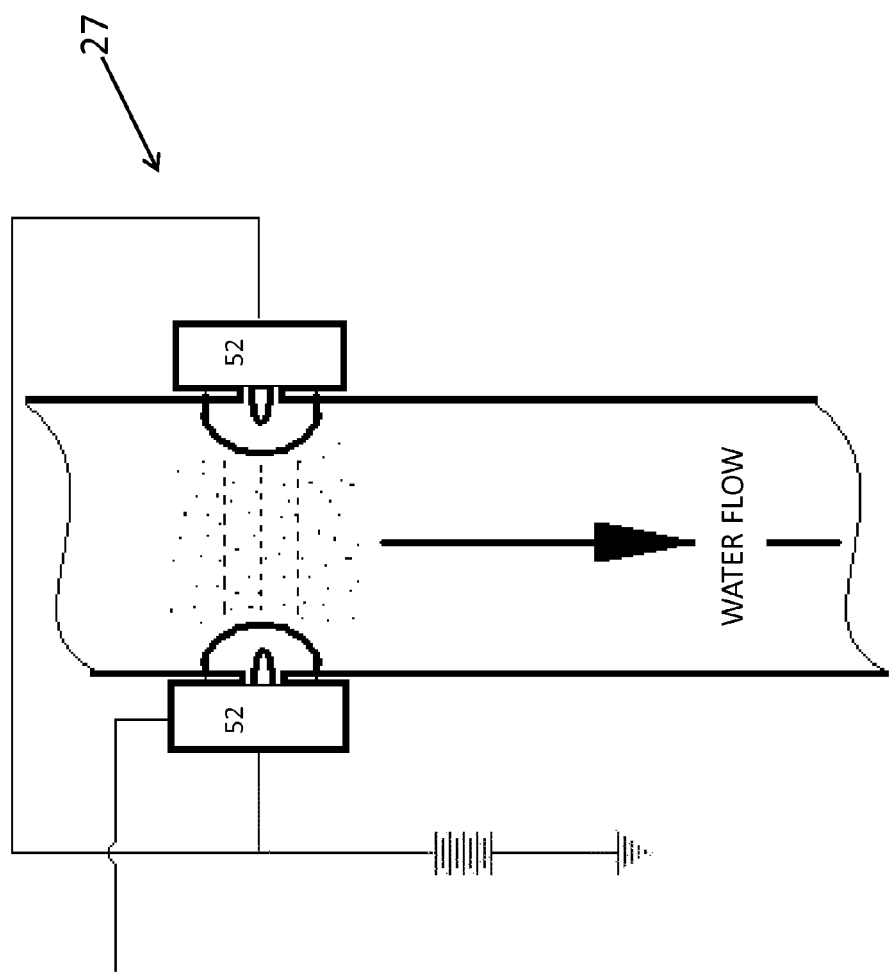
FIG. 3 is a schematic of a portion of the water treatment system of FIG. 1, depicting the turbidimeter and a portion of the feed system for transferring water from the treatment tank to the storage tank.

Referring to FIG. 2, treatment station 12 includes a conduit 38 and a pump 33 for delivering wastewater to treatment tank 20. As the wastewater is being delivered to treatment tank 20 via conduit 38, treatment chemicals stored in reservoirs or containers 31 and 32 are added to the wastewater via a dosing pump 26 in a way that provides for adequate mixing and interaction of these chemicals with the wastewater. Therefore, no additional mixing equipment is required to provide adequate mixing of the chemicals with the wastewater. The treatment chemicals that react with the contaminants present in the wastewater create a binding and settling effect. The wastewater contaminants are bound together in relatively large and/or heavy particles that settle at or near the bottom of treatment tank 20 to form a contaminant layer, i.e. a mixture of coagulated contaminants and a relatively small amount of water, while the rest of the wastewater, now substantially clean, remains above the settled contaminant layer. Flow of material (contaminants, water, etc.) from treatment tank 20 exits treatment tank 20 via a discharge assembly 27 (a portion of which is shown in FIG. 3), which can direct the flow of material to multiple conduits as needed. In one embodiment, discharge assembly 27 may be positioned at the bottom of treatment tank 20, such that gravity is utilized to force the material through discharge assembly 27 instead of a pump. For example, the contaminant layer may be directed away from treatment tank 20 to a waste location, for example a sewer, waste pit, a filter that will separate the soils from the water, or to some other suitable location, via a conduit 36, while treated water may be directed from treatment tank 20 through a conduit 35 to storage station 14. In some embodiments, flow of material to storage station 14 via a conduit 35 may be aided by a pump 28.

As shown in FIG. 2, the output stream or material flow of treatment tank 20 can be directed to either the waste location via a valve 34, or a second tank via a valve 39, in order to separate clean, treated water from water containing contaminants. In one embodiment, controllers 29 and 30 can be used to open or close valves 34 and 39, respectively. Controllers 29 and 30 may comprise a PLC controller, a printed circuit board, or another type of controller, as would be understood by a person skilled in the art. Valves 34 and 39 may be any valve that would be suitable for controlling the flow of a liquid containing suspended solids without jamming or failing, for example a Milwaukee Controls Valve Model MCR 2001.

Referring again to FIG. 3, discharge assembly 27 may include a turbidimeter or conductivity meter 52 to determine when water exiting treatment tank 20 is within the desired clarity specifications for transfer to storage tank 40. In some embodiments, turbidimeter 52 sends one or more signals to controllers 29 and/or 30 to direct flow through discharge assembly 27 to conduits 35 or 36, via valves 39 and 34, based on the detected sediment levels passing therethrough. Alternatively, a timer may be used to determine when, and for how long, the contents of treatment tank 20 are allowed to drain through discharge assemble 27 after the settling time has elapsed. For example, the timer could be preset with a desired time for which the contents of tank 20 are allowed to drain through valve 34 to the waste location. After this time elapses, valve 34 could be closed, and valve 39 opened, thereby allowing the remaining contents of tank 20 to be sent to storage tank 40.

Accordingly, the contaminant layer is removed from treatment tank 20, for instance by draining the contaminant layer through discharge assembly 27. This step removes most or all of the contaminants present in the pre-treated wastewater, along with only a relatively small amount of water. The water drained out of treatment tank 20 as part of the contaminant layer assists in pushing the coagulated contaminants out of the bottom portion of treatment tank 20. In one embodiment, the conical shape of the bottom portion of tank 20 contributes to the efficiency in removing the contaminant layer. The contaminant layer can be diverted back to a wastewater source or collection tank (not shown), or can be sent to some other location for additional treatment or disposal, via conduit 36. The portion of the water remaining in treatment tank 20 after the removal of the contaminant layer is suitably clean for use in an application requiring substantially clean water. This clean water is then transferred to storage tank 40, where it can be held until needed for use. Treatment tank 20 can then be refilled with a new batch of wastewater that needs to be treated.

As contemplated herein, dirty water is added to treatment tank 20 via a fill leg 22 and conduit 38 using an inlet pump 33, if required. Dosing pump 26 transfers treatment chemicals from at least one reservoir. For example, such reservoirs may include a coagulant reservoir 31 and a flocculant reservoir 32.

A coagulant and/or a flocculant may be fed via pump 26 into the dirty water entering tank 20. In other embodiments, treatment chemicals may be added directly into tank 20 by one or more separate ports, and mixed with the dirty water within the tank. For instance, the inherent motion and turbulence created by the addition of the wastewater to the tank may promote the mixing of the chemicals with the wastewater. In addition, the geometry and/or internal features of the tank may further promote the mixing of the chemicals with the wastewater. Therefore, no additional mixing equipment, for example an agitator driven by a motor, is required to provide adequate mixing of the chemicals with the wastewater.

In one embodiment, an adequate level of mixing of the wastewater with the treatment chemicals is provided solely based on the motion of the wastewater being added to the tank. In one such embodiment, the wastewater to be treated is added at such a rate, and in such a manner, to create turbulence that promotes the mixing of the wastewater with the treatment chemicals. In another embodiment, the mixing of the wastewater and treatment chemicals is further enhanced through the presence of baffles or other obstructions in the first tank. In such an embodiment, at least one baffle or obstruction is present inside the first tank, and the baffle or obstruction changes the flow pattern of the wastewater as it interacts with the tank. Therefore, in a preferred embodiment, no additional mixing or agitation equipment is required to adequately mix the treatment chemicals with the contaminated water. However, additional mixing equipment may be included with the system of the present invention. Such additional mixing equipment can include, but is not limited to, an agitation system comprising an agitator shaft, agitator blades extending from the agitator shaft, and a motor to drive the agitator shaft.

In another embodiment, the treatment chemicals are added to the system via an injector assembly instead of, or in addition to, a pump. The injector assembly may comprise at least one venturi chamber having at least one suction port in fluid communication with the at least one venturi chamber. The injector assembly may also include at least one chemical container containing a treatment chemical, where the chemical container is fluidly connected by a first tube to the at least one venturi chamber via the at least one suction port. The venturi chamber is connected to the same conduit 38 through which wastewater is being added to the treatment tank 20, by a second tube or other means. The wastewater passes through the at least one venturi chamber, thereby drawing the treatment chemical from the chemical container into the venturi chamber. Accordingly, the treatment chemical is mixed with the wastewater via the venturi chamber.

Tank 20 may comprise additional components, such as a minimum level float 21, a maximum level float 24, a skimmer 23, and a vent 25. Once the filling of the first tank with dirty wastewater is complete, there may be surface contaminants, for example foam or scum, present at or near the top of the water line in tank 20. These surface contaminants may be removed by skimmer 23 and can be sent to a waste reservoir via a conduit 37. In one embodiment, skimmer 23 is located at or near the top of the tank 20. Alternatively, the present invention may comprise a skimmer or other type of foam or scum removing device that can remove surface contaminants regardless of the fill volume of the first tank 20. In various embodiments, the foam or scum may be removed during the settling time, after the contaminant layer is removed and before the tank is fully empty, or at some other time prior to completing the transfer of the contents from the first tank to the second tank.

Figure 5:
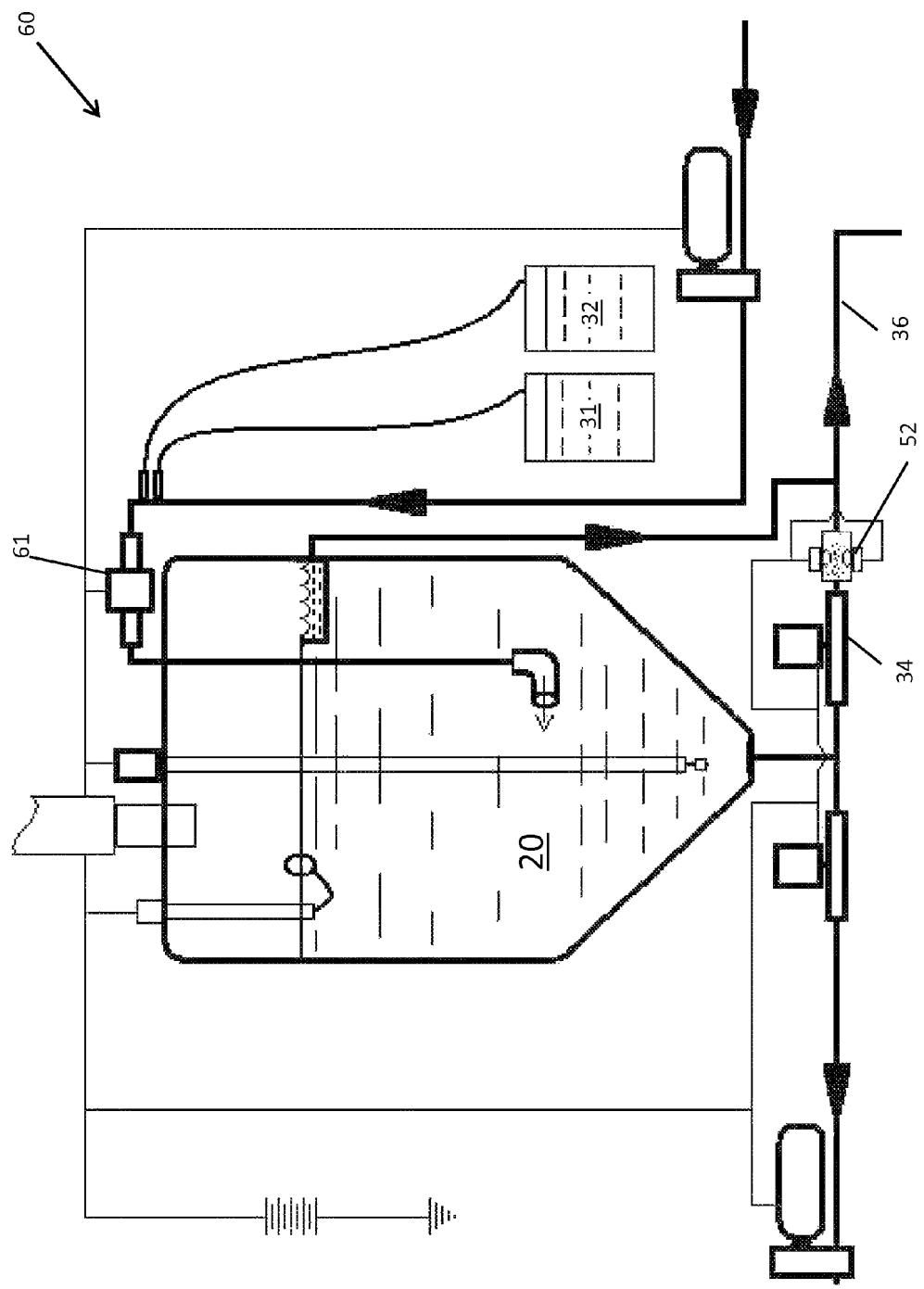
FIG. 5 is a schematic of another embodiment of a treatment station.

Referring to FIG. 5, another embodiment of a treatment station 60 is shown. In this embodiment, turbidimeter 52 is located in conduit 36 such that valve 34 may be controlled based on data from turbidimeter 52 to determine when to stop transferring contents of tank 20 to the waste location. Also, pump or venturi chamber 61 is used to add treatment chemicals from containers 31 and 32 to tank 20.

Figure 4:
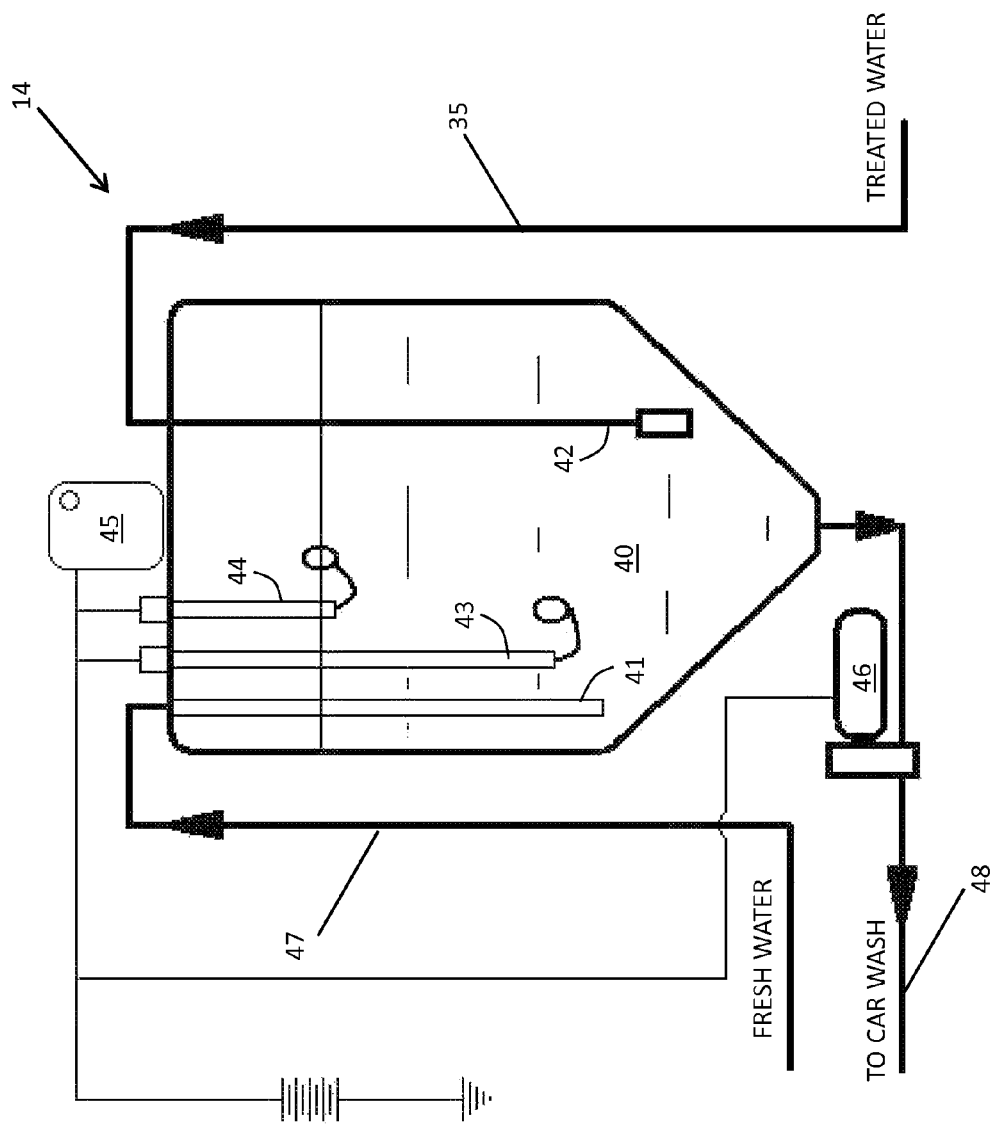
FIG. 4 is a schematic of the storage station of the water treatment system of FIG. 1.

Referring to FIG. 4, treated water enters storage tank 40 in storage station 14 via conduit 35. The treated water is sent to be re-used in cleaning applications via a conduit 48 optionally with the assistance of a pump 46. If there is not enough treated water available in storage tank 40 for cleaning applications, additional water, for example fresh water or substantially clean water, can be added to the system via a conduit 47 through port 41 from any additional water source as would be understood by those skilled in the art. For example, the source of additional water may be city water, or it may be cleaned water from additional treatment stations 12. It should also be appreciated that system 10 is not limited to any number or ratio of treatment stations 12 and storage stations 14. For example, system 10 may include 2, 3, 4, 5, or 10 treatment stations, which all deliver cleaned water to a single, central storage station 14, or a plurality of storage stations, for the delivery of cleaned water to localized cleaning applications.

As illustrated in FIG. 4, treated water enters storage tank 40 via a conduit 35 with a check valve 42 at the end. Storage tank 40 may further comprise a minimum float 43 and a maximum float 44. A tank level controller 45 may be used to determine when additional water needs to be added via water port 41, or when treated water should be drained from storage tank 40, based at least in part on data received from minimum float 43 and maximum float 44. In one embodiment, tank 40 may also have a similar configuration to tank 20, wherein further separation of clean water from dirty water could occur either with settling alone, or with a second application of treatment chemicals. In addition, storage station 14 may comprise a turbidimeter that may be used similarly to the uses described for treatment station 12.

In one embodiment, storage tank 40 may also comprise a skimmer, for use in cases when foam or scum is transferred from the first tank 20 to the storage tank 40, i.e. when residual contaminants remain in the first tank 20 after the chemical treatment and/or scum removal steps have been performed in the first tank 20. The foam or scum removing mechanisms described herein can be used on the second tank 40 instead of, or in addition to, such mechanisms in the first tank 20. In another embodiment, the second tank 40 may comprise a probe or sensor for the detection of contaminants in the second tank. For example, a turbidimeter may be used to confirm the cleanliness of the water that has been transferred to the second tank. If foam, scum, or other contaminants are detected in the second tank 40, an additional separation step, i.e. scum-removal step or contaminant layer-removal step, can be used to remove such contaminants from the second tank.

The present invention further includes a method or process of treating wastewater. In one embodiment, the first step of the water treatment process of the present invention is the filling of a first tank, with contaminated water, i.e. wastewater. The wastewater is typically provided from another tank or source that is not part of the system of the present invention, for instance the final settling tank in the pits of a carwash or truck wash facility. However, the contaminated water could be provided from any tank in which dirty or contaminated water is deposited, for example from any tank designed to receive water from transportation vehicle washing activities prior to any form of settling and/or treatment. In one embodiment, the first tank has a bottom portion that is substantially conical and an upper portion that is substantially cylindrical. However, the first tank may be of any geometry as would be understood by a person with ordinary skill in the art.

In one embodiment, as wastewater is transferred from a wastewater source to the first tank of the system of the present invention, at least one coagulant and/or flocculant are added to the water. The at least one coagulant or flocculant can be added to the wastewater immediately prior to the wastewater entering the first tank, simultaneously with the wastewater entering the tank, or after the wastewater has entered the tank. The coagulant and/or flocculant may be added by means of a pumping or dosing system that can add a desired amount of treatment chemical at a substantially consistent rate over a desired amount of time. For instance, in one embodiment, the treatment chemicals can be added at a substantially consistent rate over the entire time of transfer of wastewater from the dirty water source to the first tank. In another embodiment, the treatment chemicals can be added over only a portion of the time the wastewater is being added to the first tank. For example, the entire amount of treatment chemicals for a given batch size may be added during the first half of wastewater addition to the first tank. In other embodiments, the entire amount of treatment chemicals for a given batch size may be added over some other portion of the wastewater addition to the first tank. The treatment chemicals can be added via any pump as would be understood by a person with ordinary skill in the art, for example, a peristaltic pump or diaphragm pump. An example of a peristaltic pump that can be used is a Blue White peristaltic pump, model number A100. In one embodiment, as the coagulant and flocculant are added to the contaminated water during the initial fill step of the present invention, a significant amount of the soil, dirt, and other contaminants in the wastewater will almost immediately coalesce and settle out of solution and/or suspension.

The volume of treatment chemicals of the present invention can be added in varying proportions with respect to the volume of wastewater. In a preferred embodiment, the ratio of treatment chemicals to contaminated water is about 200 ml of coagulant per 200 gallons of water, and about 100 ml of flocculant per 200 gallons of water. However, the ratios of coagulant and flocculant can vary substantially based on the properties of the water being treated, the types of coagulants or flocculants used, or the fresh water source used in the carwash. For instance, variations in soil loading, pH, or other measurable characteristics associated with either the fresh water source, the dirty water being treated, or both, can result in different ratios of chemical additives per gallon of contaminated water. Furthermore, variations in the cleaning process in which the fresh water is used can result in increased or decreased demand of the treatment chemicals needed to adequately treat the contaminated water. Variations in the cleaning process can include, for example: variations in detergent amounts used in conjunction with the fresh water; the use of other chemicals aside from detergents in the cleaning process; or the degree of soiling of the equipment being cleaned. Further, the amount of coagulant added in the water treatment process of the present invention can be the same or substantially different than the amount of flocculant added. In one embodiment, the method of the present invention comprises the addition of a coagulant or a flocculant, but not both. In another embodiment, other types of treatment chemicals or agents, in addition to flocculants or coagulants, may be used with the systems and methods of the present invention, for example deodorizers, defoamers, biological aids, oxygen sources, or other chemicals that could aid the process. In yet another embodiment, the coagulant and flocculant may be added at different times. For example, the coagulant is added, then a reaction time will be allowed to elapse, and then the flocculant is added.

In various embodiments, the coagulant may be any coagulant suitable for water treatment applications, as would be understood by a person skilled in the art. In a preferred embodiment, the coagulant of the present invention comprises an aluminum chlorohydrate. An aluminum chlorohydrate is preferred because it is less likely to affect the drying efficiency or the surface treatment, i.e. wax finish, of a vehicle in carwash applications. In another embodiment, the coagulant may comprise polydiallyldimethylammonium chloride (polyDADMAC). In another embodiment, two or more types of coagulant can be used in the treatment methods of the present invention.

In various embodiments, the flocculant may be any flocculant suitable for water treatment applications, as would be understood by a person skilled in the art. In a preferred embodiment, the flocculant comprises an anionic partially hydrolyzed polyacrylamide. In another embodiment, the flocculant may comprise any type of polyacrylamide. In another embodiment, two or more types of flocculant can be used in the treatment methods of the present invention.

In various embodiments, the method of the present invention may comprise the use of other treatment agents or chemicals, for example a deodorizer or bioaugmentation agent. In one embodiment, the deodorizer may comprise hydrogen peroxide or another deodorizer, such as DuBois/Mitco NILODOR J885 or DuBois product N0-J820, 856, 863, 866, or 888. In another embodiment, the deodorizer may comprise any chemical that either masks or eliminates odors, as would be understood by a person skilled in the art. In one embodiment, the bioaugmentation agent may comprise DuBois/Mitco product BioAug 10175, 10178, or Mit No-BoDH. In another embodiment, the bioaugmentation agent may comprise any mineral, any bacteria, or any other material that either adds biological activity or encourages biological growth, so as to assist the digestion and removal of contaminants from wastewater.

The batch size of the water treatment process of the present invention can vary. In one embodiment, the batch size can range from about 50 to 2000 gallons. In another embodiment, the batch size can be more than 2000 gallons or less than 50 gallons. In various embodiments, the batch size may be dependent on either the size of the initial tank used in the process of the present invention, or the size or throughput of the transportation cleaning operation, i.e. how often clean water is needed or how often soiled equipment is being cleaned.

As shown in FIG. 6, method 500 may include the steps of transferring wastewater to a first tank, i.e. treatment tank, from a wastewater source 510; adding at least one treatment chemical to the wastewater 520; holding the contents of the treatment tank for a settling time 530; and removing a contaminant layer 540. The method 500 may further comprise the steps of removing a foam or scum layer 550; transferring treated water to a second tank, or storage tank 560; and using the treated water in an application instead of using water from a fresh water source 570.

As described herein, the wastewater treatment method of the present invention is based on treatment chemicals reacting with contaminants to form large and/or heavy particles that settle out of the wastewater, i.e. a binding and settling effect. The time for the binding and settling effect to occur may vary based on a number of factors, such as, but not limited to: the nature and amount of contaminants present in the wastewater; the composition of the fresh water that was used to create the wastewater, i.e. the hardness, pH, etc. of the fresh water used in the cleaning activities; the amount of treatment chemicals added to the system; and the size and geometry of treatment tank 20, or other associated equipment. In one embodiment, this settling time period may start immediately after the addition of wastewater to the first tank is completed. In another embodiment, the settling time period starts immediately after the addition of treatment chemicals to the wastewater is completed.

The binding and settling effect described herein occurs relatively quickly, typically in the range of 10 to 60 minutes, instead of the many hours or days that would be needed to allow the contaminants to settle out without the use of the treatment chemicals. Accordingly, once the addition of wastewater and/or treatment chemicals to treatment tank 20 is complete, the contents of treatment tank 20 are allowed to sit for a specified period of time, i.e. a settling time, to allow the binding and settling effect to occur.

In one embodiment, the settling time period may be any time in the range of 10 to 60 minutes. However, the settling time period may be longer than 60 minutes, or shorter than 10 minutes, as would be understood by a person with ordinary skill in the art. In a preferred embodiment, the settling time period is about 30 minutes. In one embodiment, no settling time period is required, for example, in a situation where the contaminant particles created by the chemical treatment settle relatively fast and the batch size is relatively large. In such an embodiment, the contaminant layer is removed immediately after the transfer of wastewater and/or addition of treatment chemicals to the first tank is complete. The time for settling can be adjusted to balance the level of cleanliness of the treated water with the level of demand or need for treated water. For example, the settling time can be shorter when treated water is needed sooner, or when treated water of a relatively low quality is desired.

As described herein, the contaminant layer comprises coagulated contaminants that have settled at or near the bottom of the first tank in addition to a relatively small amount of water. In one embodiment of the present invention, the amount of the contaminant layer removed from the first tank is about 10% of the total volume of the first tank contents. In other embodiments, the amount of the contaminant layer can be more or less than 10% of the total volume of the first tank contents. The amount of the first tank contents removed as the contaminant layer can be dependent on different factors, such as the contaminant loading of the source wastewater, the geometry of the first tank, the volume associated with any transfer lines or hoses connected to the first tank, or other considerations, as would be understood by a person skilled in the art. In one embodiment, the contaminant layer removed from the first tank can be further processed to yield material suitable for other uses, for example as a fertilizer or soil amendment. In such an embodiment, the water associated with the contaminated layer can be reclaimed back into the system of the present invention after the contaminant layer is processed.

In one embodiment of the present invention, various types of analytical instrumentation can be used to determine how much of the first tank contents are removed as the contaminant layer. As described previously, a turbidimeter or turbidity probe, or a conductivity probe can be used to measure the water clarity exiting the first tank, such that the amount of the contaminated layer removed can be controlled based on a measured change in the turbidity of the water exiting the first tank. Such probes or sensors can be used to measure the relative contamination level of the water exiting the first tank in order to determine when to close a valve at the bottom of the first tank to stop the transfer of contents out of the first tank. The probes or sensors can preferably be placed at or near the bottom of the first tank, in relatively close proximity to the bottom valve of the first tank, or in some other location, such as in a transfer line connected to the first tank.

One advantage of the system of the present invention is that it can clean water without the use of a mechanical filtration mechanism, i.e. filter. However, mechanical filtration equipment can be used in addition to the chemical treatments described herein. For example, a cyclone particle separator, cartridge filter, automatic back-flush filter, or other mechanical filtration mechanism that would remove heavy soils or relatively large contaminant particles prior to entering the dirty water tank, or at some other point in the process, may be added to the system. Such mechanical filtration equipment may be added to the system of the present invention to improve the quality of the treated water, i.e. to achieve higher quality water specifications, or to protect pumps, valves, or other components of the present invention from reduced lifespans caused by wear related to suspended or sludge soils. In various embodiments, the filters could range from a 5-micron pore-size filter for removing tiny suspended particles from the untreated water, to a 1-inch pore-size filter for screening very large contaminants or debris, such as bottle tops, leaves or larger-size trash present in wastewater. However, the filters are not limited to any specific embodiment described herein.

In various embodiments, the present invention comprises a control system that makes the decisions necessary for automated operation of the present invention. In one embodiment, the control system comprises a computer connected to the various sensors of the present invention. In one embodiment, the present invention comprises a programmable logic controller (PLC) that is used to make decisions or adjustments to the wastewater treatment process. In another embodiment, a mechanical control system may be used that uses relays and mechanical controls. In yet another embodiment, the control system comprises any computer system and/or software that can be used to make decisions relating to operation of the wastewater treatment system of the present invention, as would be understood by a person skilled in the art. The control system of the present invention can be used to receive information from any equipment associated with the present invention, such as, but not limited to: a turbidimeter or other sensors or probes; automated valves, for example solenoid valves; automated transfer pumps; floats; skimmers or other foam removal equipment; dosimeters or pumps used for controlling the addition of treatment chemicals; or automated mechanical filtration equipment. After receiving information from the equipment, the control system can then send signals to the equipment for the purpose of adjusting the conditions of the wastewater treatment system.

In one embodiment, the control system of the present invention may make adjustments based on the relative soiling of the contaminated water and/or the composition and characteristics of the fresh water source. In such an embodiment, the control system may cause more or less coagulant and/or flocculant to be added to the contaminated water during the initial fill sequence, as compared to an initial set-point or initial determination of demand. In another embodiment, measurements from the turbidimeter of the present invention can be linked to the dosing amount of coagulant and flocculant chemicals added to the process, thereby aiding in the optimization of chemical usage based on the relative contamination level of the wastewater being treated. For example, relatively dirty water could require more chemical treatment than relatively clean water. Such a demand-sensing system would reduce costs of operation by minimizing chemical use in the case of clean water, or by preventing the need to run a second wastewater treatment cycle on a batch of wastewater because the wastewater was not properly treated in a first cleaning/treatment cycle. It is anticipated that the automated sensing of the contamination level of the water may require a calibration step that could be performed locally, or could be performed by the manufacturer of the wastewater treatment system prior to shipment of the system to a customer.

The water treatment system of the present invention may comprise additional components or types of equipment. For example, an ozone generation device for odor neutralization, or a device for adding air or oxygen for bio-augmentation, may be included in the system.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1: Wastewater Treatment at a Car Wash

The system and method of the present invention was used to clean dirty water from a carwash pit. A number of parameters were changed during testing of the system and method in this example. In a preferred embodiment, dirty wastewater, having a pre-treatment turbidity typically in the range of about 250-400 nephelometric turbidity units (NTU), was fed into the system and cleaned to a level typically in the range of about 15-60 NTU.

The system was tested using different settling times, i.e. the amount of time the contents of the treatment tank were allowed to sit after combining the treatment chemicals with the dirty wastewater before separating the contaminant layer from the treated water. Testing was conducted at settling times in the range of about 20 and 40 minutes, and it was found that a 30 minute settling time was preferred. Typically, a 10-20% improvement in NTUs was achieved using a 30 minute settling time compared to a 20 minute settling time. Further, a cleaning improvement of approximately 10% was typically seen when comparing a 40 minute settling time to a 30 minute settling time. Further, the system was tested using varying times for the transfer of the contaminant layer from the treatment tank, i.e. the dumping time. Dumping times in the range of about 30-45 seconds were used.

The system was also tested using different concentrations of coagulant and flocculant. In one set of experiments, the concentration was about 200 ml of coagulant per 200 gallons of wastewater and about 100 ml of flocculant per 200 gallons of wastewater (see Table 1). In another set of experiments, the concentration was about 222 ml of coagulant per 200 gallons of wastewater and about 116 ml of flocculant per 200 gallons of wastewater (see Table 2).

Tables 1 and 2 summarize a number of the experiments performed. The Batch ID represents the day and batch number performed on that day. For example, a Batch ID of 4A represents the first batch (batch A) performed on the fourth day of experiments. The Sample ID denotes whether the sample was either the untreated feed, i.e. untreated wastewater, or water treated using the system of the present invention. The turbidity values listed were measured using a Hach 2100 P Turbidimeter. A value for untreated water and a value for treated water are listed for each batch. Accordingly, the first turbidity value listed for each batch is "untreated feed," i.e. the wastewater. The second value listed for each batch is the turbidity value for a sample taken from the clean water remaining in the system at some point post-treatment. The entry for the Sample ID of the treated water lists the settling time and dumping time of the experiment. For example, "40 min settle/30 sec dump" refers to an experiment with a settling time of 40 minutes and a dumping time of 30 seconds. All experiments in Tables 1 and 2 were performed on a batch size of approximately 250 gallons.

The experimentation showed that over time the quality of untreated feed water improved with each batch. In other words, the treated water generated by the wastewater treatment process of the present invention was used in a vehicle-cleaning process, and the resulting wastewater from that vehicle-cleaning process was sent back to the treatment system. As the treated water continued to be re-used and recycled via the water treatment system of the present invention, the quality of the untreated feed improved over time. For example, untreated feed water in an initial batch (e.g. 1A in Table 1) started with a turbidity of about 300 NTU. As the wastewater was repeatedly used in cleaning processes and then treated, the quality improved to the point where the untreated feed for a later batch was less than 90 NTU (e.g. 9A in Table 1). In addition, it has been shown that higher dosing, i.e. overdosing, of the coagulant and flocculant may improve the untreated feed water from batch to batch to an even greater degree (Table 2).

TABLE 1

Water Treatment Data for 200/100 Coagulant/Flocculant Concentration

| Batch ID | Sample ID | Turbidity |
|---|---|---|
| 1A | Untreated Feed | 301 NTU |
| 1A | 40 min settle/30 sec dump | 98 NTU |
| 1B | Untreated Feed | 318 NTU |
| 1B | 40 min settle/30 sec dump | 105 NTU |
| 2A | Untreated Feed | 295 NTU |
| 2A | 40 min settle/30 sec dump | 93 NTU |
| 2B | Untreated Feed | 307 NTU |
| 2B | 40 min settle/30 sec dump | 68 NTU |
| 2C | Untreated Feed | 315 NTU |
| 2C | 40 min settle/30 sec dump | 88 NTU |
| 3A | Untreated Feed | 266 NTU |
| 3A | 30 min settle/35 sec dump | 102 NTU |
| 3B | Untreated Feed | 269 NTU |
| 3B | 30 min settle/35 sec dump | 69 NTU |
| 3C | Untreated Feed | 264 NTU |
| 3C | 30 min settle/35 sec dump | 87 NTU |
| 3D | Untreated Feed | 260 NTU |
| 3D | 30 min settle/35 sec dump | 28 NTU |
| 3E | Untreated Feed | 254 NTU |
| 3E | 30 min settle/35 sec dump | 103 NTU |
| 4A | Untreated Feed | 186 NTU |
| 4A | 30 min settle/45 sec dump | 40 NTU |
| 4B | Untreated Feed | 165 NTU |
| 4B | 30 min settle/45 sec dump | 26 NTU |
| 4C | Untreated Feed | 168 NTU |
| 4C | 30 min settle/45 sec dump | 35 NTU |
| 4D | Untreated Feed | 170 NTU |
| 4D | 30 min settle/45 sec dump | 58 NTU |
| 5A | Untreated Feed | 416 NTU |
| 5A | 30 min settle/45 sec dump | 18.3 NTU |
| 5B | Untreated Feed | 353 NTU |
| 5B | 30 min settle/45 sec dump | 24.7 NTU |
| 6A | Untreated Feed | 85.3 NTU |
| 6A | 30 min settle/45 sec dump | 14.3 NTU |
| 7A | Untreated Feed | 80 NTU |
| 7A | 30 min settle/45 sec dump | 46.8 NTU |
| 8A | Untreated Feed | 63 NTU |
| 8A | 30 min settle/45 sec dump | 18.8 NTU |
| 8B | Untreated Feed | 83.6 NTU |
| 8B | 30 min settle/45 sec dump | 18.6 NTU |
| 9A | Untreated Feed | 86.3 NTU |
| 9A | 30 min settle/45 sec dump | 35 NTU |

TABLE 2

Water Treatment Data for 222/116 Coagulant/Flocculant Concentration

| Batch ID | Sample ID | Turbidity |
|---|---|---|
| 10A | Untreated Feed | 409 NTU |
| 10A | 30 min settle/45 sec dump | 118 NTU |
| 10B | Untreated Feed | 415 NTU |
| 10B | 30 min settle/45 sec dump | 117 NTU |
| 11A | Untreated Feed | 256 NTU |
| 11A | 30 min settle/45 sec dump | 81 NTU |
| 12A | Untreated Feed | 146 NTU |
| 12A | 30 min settle/45 sec dump | 46.7 NTU |
| 13A | Untreated Feed | 99.2 NTU |
| 13A | 30 min settle/45 sec dump | 33.9 NTU |
| 14A | Untreated Feed | 117 NTU |
| 14A | 30 min settle/45 sec dump | 30.9 NTU |

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A system for treating wastewater, comprising:
    a first tank;
    a discharge assembly fluidly connected to said first tank, said discharge assembly comprising at least one turbidimeter;
    a valve assembly fluidly connected to said first tank and downstream of said discharge assembly, the valve assembly comprising a first valve and a second valve;
    a first controller electrically connected to the turbidimeter and the first valve for opening and closing the first valve based on a received signal from the turbidimeter;
    a second controller electrically connected to the turbidimeter and the second valve for opening and closing the second valve based on a received signal from the turbidimeter;
    a second tank;
    a plurality of conduits fluidly connecting the second valve of said valve assembly to said second tank and the first valve of said valve assembly to a waste reservoir;
    at least one treatment chemical source; and
    a wastewater source;
    wherein when wastewater is added from said wastewater source to said first tank, at least one treatment chemical is added from said at least one treatment chemical source to said wastewater;
    wherein when the turbidimeter senses a desired minimum clarity of the wastewater, the first controller receives a signal to close the first valve and the second controller receives a signal to open the second valve such that the wastewater flows from the first tank to the second tank; and
    wherein when the turbidimeter does not sense a desired minimum clarity of the wastewater, the first controller receives a signal to open the first valve and the second controller receives a signal to close the second valve such that the wastewater flows from the first tank to the waste reservoir.

2. The system of claim 1, wherein said first tank further comprises a skimmer.

3. The system of claim 1, wherein said second tank further comprises a skimmer.

4. The system of claim 1, wherein said first tank further comprises at least one float sensor for measuring the water level in said first tank.

5. The system of claim 1, wherein said second tank further comprises at least one float sensor for measuring the water level in said second tank.

6. The system of claim 1, wherein said second tank further comprises a turbidimeter.

7. The system of claim 1, wherein said treatment chemical is a coagulant.

8. The system of claim 1, wherein said treatment chemical is a flocculant.

9. The system of claim 1, wherein the at least one treatment chemical is added using a dosing pump.

10. The system of claim 1, further comprising a third controller for adjusting an addition rate of said at least one treatment chemical.

11. The system of claim 1, wherein the first tank is filterless.

12. The system of claim 1, wherein the bottom portion of the first tank is conical shaped.

13. A system for treating wastewater, comprising:
a first tank;
a discharge assembly fluidly connected to the first tank, the discharge assembly comprising a turbidimeter;
a valve assembly fluidly connected to the first tank and downstream of the discharge assembly, the valve assembly comprising a first valve and a second valve;
at least one controller electrically connected to the turbidimeter and the first and second valves for opening and closing the first and second valves based on a received signal from the turbidimeter;
a second tank;
a plurality of conduits fluidly connecting the second valve of the valve assembly to the second tank and the first valve of the valve assembly to a waste reservoir;
at least one treatment chemical source; and
a wastewater source;
wherein when wastewater is added to the first tank from the wastewater source, at least one treatment chemical is added from the at least one treatment chemical source to the wastewater in the first tank;
wherein when the turbidimeter senses a desired minimum clarity of the wastewater, the at least one controller receives a signal to close the first valve and open the second valve such that the wastewater flows from the first tank to the second tank; and
wherein when the turbidimeter does not sense a desired minimum clarity of the wastewater, the at least one controller receives a signal to open the first valve and close the second valve such that the wastewater flows from the first tank to the waste reservoir.

14. The system of claim 13, wherein the first tank is filterless.

15. The system of claim 13, wherein the bottom portion of the first tank is conical shaped.

16. The system of claim 13, wherein the first tank further comprises a skimmer.

17. The system of claim 13, wherein the first tank further comprises at least one float sensor for measuring the water level in the first tank.

18. The system of claim 13, wherein the at least one treatment chemical is added using a dosing pump.

19. The system of claim 13, wherein the treatment chemical is a coagulant.

20. The system of claim 13, wherein the treatment chemical is a flocculant.

* * * * *